US009524507B2

(12) United States Patent  
Zamer

(10) Patent No.: US 9,524,507 B2  
(45) Date of Patent: Dec. 20, 2016

(54) COMMUNICATION DEVICE INPUT INTERFACES FOR USE IN DETERMINING A MORE ACCURATE COST OF AN ITEM

(71) Applicant: PAYPAL, INC., San Jose, CA (US)

(72) Inventor: Kamal Zamer, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/629,209

(22) Filed: Feb. 23, 2015

(65) Prior Publication Data

US 2016/0247177 A1    Aug. 25, 2016

(51) Int. Cl.
*G06Q 30/00* (2012.01)
*G06Q 30/02* (2012.01)

(52) U.S. Cl.
CPC .................................. *G06Q 30/0206* (2013.01)

(58) Field of Classification Search
USPC .................................. 235/380; 705/26.1–26.7
See application file for complete search history.

(56) References Cited

U.S. PATENT DOCUMENTS

| 8,290,818 | B1 * | 10/2012 | Levitan | G06Q 30/0631 705/26.7 |
| 8,374,922 | B1 * | 2/2013 | Antony | G06Q 30/00 705/26.1 |
| 8,438,052 | B1 * | 5/2013 | Chanda | G06Q 30/0207 705/7.11 |
| 9,123,069 | B1 * | 9/2015 | Haynes | G06Q 30/0625 |
| 2006/0293918 | A1 * | 12/2006 | Dragani | G06F 19/328 705/2 |

\* cited by examiner

*Primary Examiner* — Daniel Hess
(74) *Attorney, Agent, or Firm* — Haynes and Boone, LLP

(57) ABSTRACT

There are provided systems and methods for communication device input interfaces for use in determining a true cost of an item with associated purchases. A user may utilize a communication device, such as a mobile phone or wearable computing device, to input information identifying an item. The input may be an image, audio, or text input. The input may be communicated to a server that determines associated purchases required or recommended with the item identified by the user. For example, the user may be recommended to purchase additional items for the installation of the item or for repairs to a home, work, or vehicle when using the item. The user may also be required to purchase shipping, labor, or other additional costs. The additional purchases may be determined from user and merchant information. A total cost for the item and the additional purchases may be determined for the user.

20 Claims, 5 Drawing Sheets

COMMUNICATION DEVICE INPUT INTERFACES FOR USE IN DETERMINING A MORE ACCURATE COST OF AN ITEM

TECHNICAL FIELD

The present application generally relates to communication device input interfaces for use in determining a more accurate or an effective cost of an item and more specifically to using costs of other purchases that may be required or desired with the item.

BACKGROUND

A user may visit a merchant location in order to shop for products, services, goods, or other merchandise (collectively referred to as an "item" or "items" herein). The user may require an item, such as new installations in a home, work location, or vehicle (e.g., to fix or repair the location/vehicle). At other times, the user may simply wish to purchase physical items, such as appliances, clothing, or other physical goods. However, when the user selects an item for purchase, they may view a price for the item that does not include possible additional required or desired costs, such as tax, shipping, labor for installation of the item, and/or insurance for the item. Moreover, the user may not be aware of additional required items to purchase with the item identified by the user for purchase. For example, a purchase of a new television may require associated power and signal cords. Likewise, purchase of new flooring for a house may require repairs to a subflooring not known to a user, binding agents, and/or sealants. Thus, when the user selects an item for purchase, the user may be unaware of the actual cost for use of the item.

Figure 1:
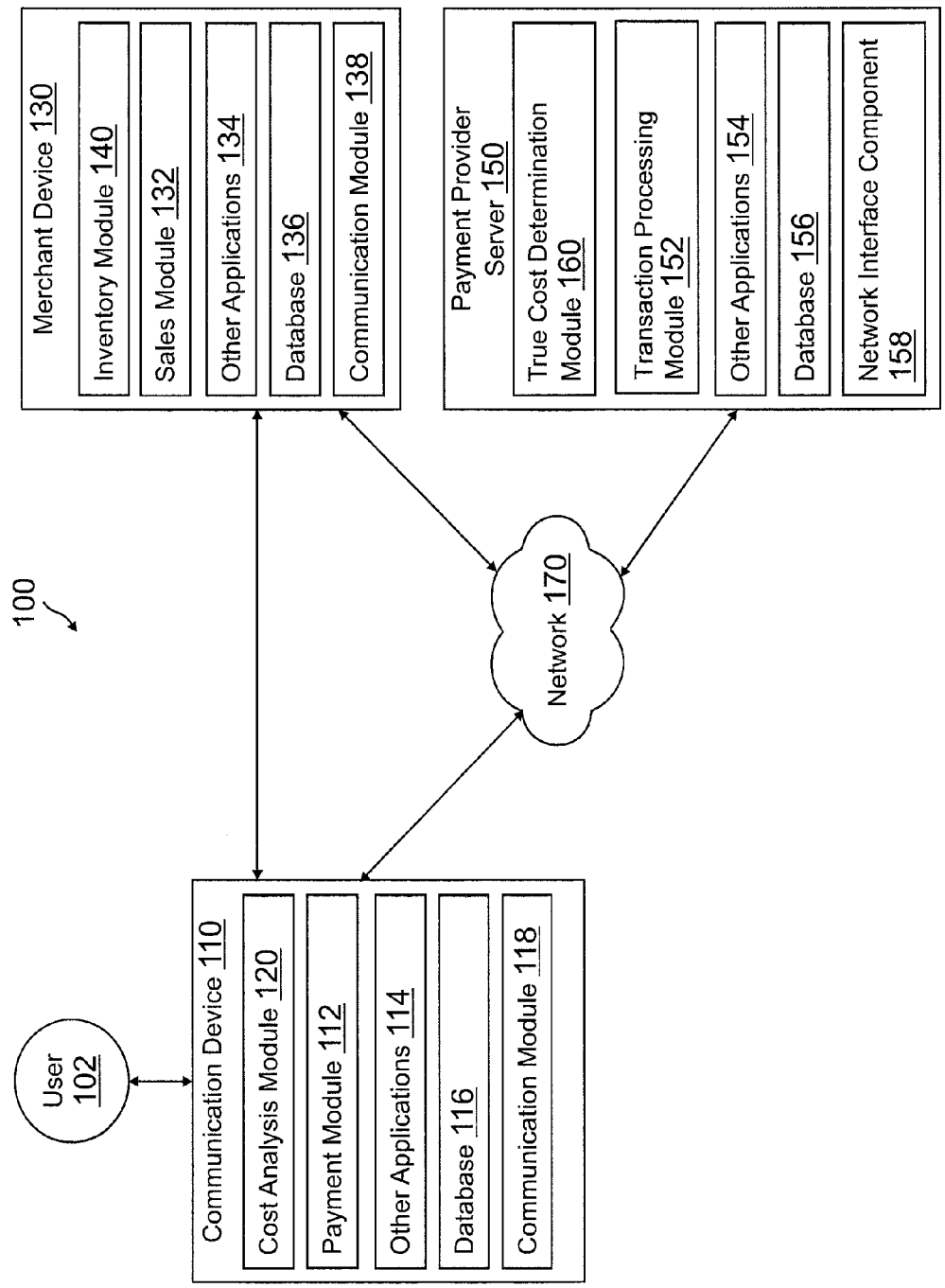
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized by communication device input interfaces for determining a more accurate or an effective cost of an item (also referred herein as a "true" cost). Systems suitable for practicing methods of the present disclosure are also provided.

A user may visit a merchant location to shop for one or more items. While at the merchant location, the user may utilize a communication device to enter information identifying at least one item the user wishes to purchase. The item may correspond to some good, product, service, or other merchandise. Thus, the information identifying the item may include an image of the item (e.g., still or video image) or the item identifier (e.g., a barcode on the item/item packaging), text input of the item name or identifier, voice input identifying the item, or other information allowing for identification of the item. The user may identify the item in order to receive a price of the item, description of the item, ordering details for the item, or other information. The communication device may interface with a merchant device (e.g., through a wireless beacon at the merchant location or a connection with the merchant device) and may receive information about the item. Thus, various merchant locations may provide short range wireless communications with users' communication devices, such as through beacons using Bluetooth Low Energy (BLE), LTE Direct, or other communication protocol. These beacons may be set up at the merchant location, such as at or nearby an entrance to the merchant location, throughout the merchant location and sub-areas of the merchant location (e.g., at sales aisles, booths, or other sub-areas), and/or at checkout counters where a user pays for a transaction. The beacons may communicate with devices in possession of users in order to connect to the device and determine the user is in proximity to the beacon. The beacons may provide additional functionality, such as establishing a connection with a merchant device to provide the user with merchant information and communicate information about the user's location to the merchant. In other embodiments, the communication device may receive the information over a network connection with another entity, such as a merchant server, payment provider, online marketplace, or other information provider.

The user may also receive information about ancillary, additional, or other purchases that may be required, necessitated, desired, and/or recommended when purchasing the item identified in the user input. The additional purchases may increase a cost of the item, such that the total cost amount for purchase of the item with the additional purchases is determined. In this regard, the communication device may communicate the user input to a server, such as an online marketplace server, merchant server, and/or payment provider, which may determine the item identifier in the user input and further determine the additional purchases required when purchasing the item. The additional purchases may be determined using past purchases alongside the identified item by other users. For example, when purchasing a new electronic device, previous users may purchase power cords, connection cable, power chargers, and/or batteries. Thus, the additional purchases may include required or recommended items to purchase with the identified item in order to utilize the identified item. The additional purchases may also include costs associated with the purchase that may not be readily apparent to the user, including shipping costs, labor costs to construct, move, or install the item, tax costs (e.g., state, local, and/or item specific taxes), repair costs to the item or required through movement/installation of the item, and/or insurance costs. The additional purchases determined using the past purchases may be determined using past receipts or other transaction histories by the merchant with the past users or by other merchants offering the same or similar item for sale and/or by merchants providing items associated with the initial purchase.

The additional purchases may also be determined using the item information received from the merchant, such as a description of the item and/or item type/brand, status of the item, age of the item, condition of the item, or other information about the item. Thus, the user may be recommended additional purchases or required to purchase the additional purchases based on information received from the merchant. The information received from the merchant may also include merchant fees, which may include a shipping fee if the item is not immediately available or needs to be ordered, a restocking fee, a processing fee, or other fees required by the merchant. The merchant information may also include costs associated with a service provided by the merchant, such as costs incurred for a repair (e.g., new items and labor costs for installation of the item). The server may access inventory information, pricing information (e.g., menus, online pricing guides, etc.), or other merchant information from the merchant for use in determining the additional purchases.

The server may also receive and/or access user information, which may be utilized to determine the additional purchases. The user information may be provided by the user, such as through personal and/or financial information. Thus, the additional purchases may include purchases required by the user's information, such as additional costs incurred due to health conditions, preferences, location, etc. The additional purchases may also be necessitated by the user's financial status, include a potential interest rate incurred due to the user's credit rating, an interest rate of a credit card used to pay for the item, or a cost of overdrawing an account. The user's information may also be accessed from a third party entity, which may include information about the user, such as a location for the user (e.g., work/home), a vehicle for the user, health information about the user, preferences of the user, financial information about the user, etc. Thus, the user may not provide the user information and may be unaware of the user information. For example, a building history, county property record, vehicle history, etc., may include information about other purchases required by the user (e.g., repairs necessitated if the user purchases an item for a location/vehicle).

Once the additional purchases are determined, the server may determine a true cost for purchase of the item using the cost for the item and the additional purchases. The true cost may be communicated to the communication device of the user so that the user may view a cost of the item including the additional purchases. The user may then make a more informed decision on whether to purchase the item. If the user chooses to purchase the item, a purchase request for the item, as well as the additional purchases in various embodiments, may be communicated to the server, another payment provider, and/or the merchant, which may process and complete payment for the item (and the additional purchases where applicable). A transaction history may then be provided to the merchant and/or user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a merchant device 130, and a payment provider server 150 in communication over a network 170. User 102 with communication device 110 may travel to a merchant location associated with merchant device 130 in order to shop for one or more items. While at the merchant location, user 102 may utilize communication device 110 to input information identifying an item that user 102 wishes to purchase at the merchant location. The user input may be communicated to payment provider server 150, which may determine additional, ancillary, and/or recommended purchases with the item. Merchant device 130 may provide inventory information to payment provider server 150, which may include information allowing payment provider server 150 to determine the additional purchases and/or cost information. Payment provider server 150 may determine a total cost for the item and the additional purchases using the cost information about the items, such that a "true cost" to purchase the item is determined that reflects a cost for all purchases required or desired to utilize, install, or otherwise obtain and/or use the identified item. A purchase of the item and/or the additional items may be processed between communication device 110 and merchant device 130 by payment provider server 150.

Communication device 110, merchant device 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with merchant device 130 and/or payment provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a cost analysis module 120, a payment module 112, other applications 114, a database 116, and a communication module 118. Cost analysis module 120, payment module 112, and other applications 114 may correspond to executable processes, procedures, and/or applications with associated hardware. In other embodiments, communication device 110 may include additional or different hardware and software as required.

Cost analysis module 120 may correspond to one or more processes to execute modules and associated devices of communication device 110 to process user input identifying an item and receive a true cost for purchase of the item with necessary or recommended additional purchases (e.g., ancillary required items). In this regard, cost analysis module 120 may correspond to specialized hardware and/or software utilized by communication device 110 to receive or otherwise process user input from user 102 that identifies an item user 102 is interested in and/or wishes to purchase. The user input may correspond to an image (e.g., still or video) captured by user 102 or retrieved by user 102 using communication device 110. The image may be captured by a camera device of communication device 110. In other embodiments, user 102 may access a local or remote database (e.g., database 116, a database 136 of merchant device 130, or a database located on a third party entity, such as an image file server). The image may include a visual representation of the item, for example, the item or item label. The image may also include a barcode, QR code, alphanumeric code, or other identifier in other embodiments. Moreover certain embodiments may include text input as the user input, such as a name, brand, item type, alphanumeric code, or other text input identifying the item, or may include voice/audio input that identifies the item (e.g., voice input by user 102, a recording of the item sound, etc.). Cost analysis module 120 may also provide tools to allow user 102 to more accurately select an item identified in user input, such as image processing features and tools, selection or highlighting tools, or other functions.

Once the user input is received, the user input may be communicated to merchant device 130 and/or payment provider server 150 for processing to determine additional items for purchase with the item identified in the user input. Cost analysis module 120 may connect with merchant device 130 and/or a wireless beacon at a merchant location for merchant device 130 to establish that user 102 is located at the merchant location. In this regard, a communication between cost analysis module 120 and merchant device 130/a wireless beacon may provide and/or verify the identity of user 102, including transmission of an identifier for user 102 and/or communication device 110, or other information used to process a check-in for user 102. Thus, check-in information may be established when a connection is made by cost analysis module 120 with one or more of merchant device 130 and the wireless beacon.

In order to establish the connection, cost analysis module 120 may receive short range wireless communications through communication module 118 at merchant location and transmit information to merchant device 130 and/or the wireless beacon, including check-in information for a check-in process that associates user 102 with the device connected with communication device 110. For example, a wireless beacon may be located at and throughout the merchant location (e.g., at an entrance, through sub-areas of the merchant location, and/or at a checkout/payment location in merchant location) and set up to communicate with communication device 110 when communication device 110 is in proximity to the wireless beacon. Thus, the wireless beacon may be range limited to connect only with devices (e.g., communication device 110) within the specified area, such as a radius around wireless beacon, a distance away from wireless beacon, and/or a signal direction for wireless beacon. When communication device 110 enters the proximity radius for the wireless beacon (or merchant device 130 in various embodiments), communication device 110 and the one or more of wireless beacons may connect and check-in information including an identifier for user 102 and/or communication device 110 may be transmitted to the connected beacons of wireless beacon.

Cost analysis module 120 may execute in the background of an operating system of communication device 110 and be configured to establish connections, using communication module 118 of communication device 110, with one or more of merchant device 130 and the wireless beacon. The connection may be established with or without input from user 102. For example, merchant device 130 and/or the wireless beacon may broadcast a token, such as a universally unique identifier (UUID), for reception by cost analysis module 120, as explained herein. Cost analysis module 120 may utilize communication module 118 of communication device 110 to receive the token from merchant device 130 and/or the wireless beacon. If cost analysis module 120 acknowledges the UUID as identifying the merchant location, merchant device 130, the wireless beacon, and/or payment provider server 150 (e.g., if cost analysis module 120 determines the UUID corresponds to a request to establish a communication channel and/or process and complete a check-in), cost analysis module 120 may transmit an identifier corresponding to user 102 and/or communication device 110 back to merchant device 130 and/or the wireless beacon. Cost analysis module 120 may utilize communication module 118 of communication device 110 to communicate with merchant device 130 and/or the wireless beacon (e.g., over near field communication, Bluetooth, Bluetooth Low Energy, radio, infrared, LTE Direct, or other communication protocol). The identifier from communication device 110 may include, be transmitted with, concatenated with, or otherwise bundled with the identifier received from wireless beacon. In other embodiments, different information may be communicated by communication device 110, such as an identifier for user 102, a name or other personal information for user 102, or other identifying information. Thus, the information does not need to be utilized to process and/or complete a check-in in all embodiments. Once a connection is established with wireless beacon, the process may associate user 102 with the one or more of wireless beacon used to connect to communication device 110.

Once a connection is established with merchant device 130 and/or wireless beacon by cost analysis module 120, cost analysis module 120 may provide the user input and/or user information for user 102 to merchant device 130 and/or the wireless beacon. The user input and/or information may be communicated to payment provider server 150 for processing. Merchant device 130 may further provide merchant information to payment provider server 150, including pricing/cost information and/or inventory information, as discussed herein. However, in other embodiments, cost analysis module 120 may provide the user input and/or information to payment provider server 150 directly using a connection over network 170. Identification of user 102 at the merchant location for merchant device 130 using the connection may also be communicated to payment provider server 150 (e.g., by communication device 110 and/or merchant device 130) for use in retrieving item, merchant, and/or cost information by payment provider server 150.

Payment provider server 150 may determine additional purchases for the item identified in the user input, as discussed herein. Once payment provider server 150 determines the additional purchases and/or the total cost for the identified item and the additional purchases, payment provider server 150 may communicate the additional purchases and/or the total cost to communication device 110 for display to user 102 through a display interface of cost analysis module 120. User 102 may therefore view the additional purchases required and/or recommended for purchase with the identified item. Cost analysis module 120 may identify each of the additional purchases as required, recommended, or commonly purchased with the identified item. Thus, user 102 may be allowed to choose which items user 102 wants to purchase. For example, user 102 may already possess batteries or choose to not purchase recommended insurance. A purchase request may then be generated through selection of one or more of the items and the additional purchases by user 102, and payment module 112 may be utilized to communicate the purchase request to merchant device 130 and/or payment provider server 150 for processing. Additionally cost analysis module 120 may receive information used with payment module 120, such as costs and/or item identifiers.

Payment module 112 may correspond to one or more processes to execute modules and associated specialized hardware of communication device 110 to provide payment tokens to merchant device 130 for use in processing and completing a payment to the merchant associated with merchant device 130 and merchant server 140. In this regard, payment module 112 may correspond to specialized hardware and/or software utilized to provide a convenient interface to permit user 102 to select payment options and provide payment for items to merchant device 130. For example, payment module 112 may be implemented as a user interface enabling user 102 to enter payment options for storage by communication device 110, provide those payment options on checkout/payment of one or more items, and complete a transaction for the item(s) through a purchase request for the item(s). In some embodiments, payment module 112 may correspond more generally to a web browser configured to view information available over the Internet or access a website corresponding to a payment service provider (e.g., payment provider server 150). Payment module 112 may utilize user financial information, such as a credit card, bank account, or other financial account, as a payment instrument when providing payment information in the form of a payment token to merchant device 130. Additionally, payment module 112 may utilize a user account with payment provider, such as payment provider server 150, as the payment instrument. In various embodiments, the payment token may be communicated to merchant device 130 directly or through one or more of wireless beacon. In other embodiments, the payment token may be communicated directly to payment provider server 150. The payment token may also include identification of the item(s) for purchase and a request to purchase the items.

Once user 102 enters information identifying an item to cost analysis module 120, communication device 110 may receive cost information for the item and additional purchases for the item, as discussed herein. User 102 may elect to complete a transaction to purchase the item and one or more of the additional purchases, for example, through selection of the item(s) in cost analysis module 120. Payment module 112 may be utilized to generate a purchase request for the item(s) and provide or identify payment information to complete the transaction. Thus, payment module 112 may populate the purchase request information from cost analysis module 120. For example, payment module 112 may be used to generate the purchase request from displayable items, or may include the purchase received from one or more of merchant device 130 and/or the wireless beacon. Payment module 112 may be utilized to facilitate creation of a payment token. The payment token may be generated using payment information (e.g. a payment instrument, such as a user account or payment card information) from payment module 112 and the payment token may be transmitted by payment module 112 to one or more of merchant device 130 and/or payment provider server 150. Payment provider server 150 may provide payment for the purchase request to the merchant or merchant device 130 may process the payment account in the payment token to receive payment for the transaction.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with a payment provider. Other applications 114 may include applications used with one or more auxiliary devices of communication device 110, such as touch input applications, camera applications, microphone applications, and/or other applications that may receive user input identifying an item. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with cost analysis module 120 and/or other applications 114, identifiers associated with hardware of communication device 110, or other appropriate identifiers, such as identifiers used for payment/user/device authentication or identification. Database 116 may include information to effectuate the check-in, such as an identifier for user 102 and/or communication device 110. User input identifying an item may also be stored to database 116, as well as information used by one or more of cost analysis module 120, such as received item information, information for additional purchases, cost information, and/or payment information used for a purchase request communicated to merchant device 130 and/or payment provider server 150.

Communication device 110 includes at least one communication module 118 adapted to communicate with merchant device 130, a wireless beacon, and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon using short range communications, such as Bluetooth Low Energy, LTE Direct, WiFi, radio frequency, infrared, Bluetooth, and near field communications.

Merchant device 130 may be maintained, for example, by a merchant, which may offer one or more items and/or services for purchase through a merchant location. The merchant location may correspond to a physical location that a user (e.g., user 102) may visit in order to purchase one or more items in a transaction. In this regard, the merchant location may correspond to a retail storefront or other type of location where one or more items are provided for purchase (e.g., a restaurant, service location, etc.). Merchant device 130 includes one or more processing applications which may be configured to interact with communication device 110 and/or payment provider server 150 to facilitate purchase and sale of items and identification of additional purchase required and/or recommended during purchase of an identified item by user 102. In such embodiments, merchant device 130 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLES. Although only a single merchant device is shown, a plurality of merchant devices may function similarly. While merchant device 130 is discussed as a device local to a merchant location, a server at or remote from the merchant location may also be utilized. Thus, one or more of the features discussed below (e.g., item inventory and/or pricing information) may be provided by EBAY®, Inc. of San Jose, Calif., USA or STUBHUB®, Inc. of San Francisco, Calif. Additionally, in some embodiments, one or more of the below described modules, processes, and/or functions may instead be performed by payment provider server 150 or another entity and vice versa.

Merchant device 130 of FIG. 1 contains an inventory module 140, a sales module 132, other applications 134, a database 136, and a communication module 138. Inventory module 140, sales module 132 and other applications 134 may correspond to processes, procedures, and/or applications, for example, a software program, executable by a hardware processor. In other embodiments, merchant device 130 may include additional or different modules having specialized hardware and/or software as required.

Inventory module 140 may correspond to one or more processes to execute modules and associated specialized hardware of merchant device 130 to enter, update, and/or maintain inventory information for a merchant associated with merchant device 130, which may correspond to a particular merchant location for merchant device 130 and/or the merchant generally (e.g., a nationally accessible inventory for a nation-wide merchant). In this regard, sales module 132 may correspond to specialized hardware and/or software to receive inventory information when inventory becomes accessible to the merchant (and/or at the merchant location), enter item information for the available items in the inventory, and/or update and maintain the inventory as the items are sold, as new items are entered, and/or as old items are replaced. Inventory module 140 may also update item information, such as a price for the item, available stock amount of the item, description of the item, discounts or benefits associated with purchase of the item, condition of the item, or other item parameters. A merchant and/or merchant employee may service the inventory and item information records using inventory module 140. Moreover, inventory module 140 may automatically update the records based on sales, returns, or other processes completed by sales module 132. Inventory module 140 may also provide inventory and/or item information to sales module 132 during a transaction, to communication device 110 when generating a purchase request and/or viewing and item and additional purchases for the item, and/or to payment provider server 150 for use in determine additional purchases required when purchasing a selected item by user 102 as well as a total cost for the selected item and the additional purchases. Thus, inventory module 140 and/or records generated and maintained by inventory module 140 may provide information used to determine a true cost of a selected item based on additionally required/recommended purchases and complete a purchase request for the item and one or more of the additional purchases.

Sales module 132 may correspond to one or more processes to execute modules and associated specialized hardware of merchant device 130 to provide a merchant sales interface permitting a merchant or merchant employee to process and complete sale transactions with user 102 for one or more items selected by user 102 (e.g., an item identified in user input by user 102 as well as one or more additional purchases). In this regard, sales module 132 may correspond to specialized hardware and/or software to access and/or receive item information for a sale (e.g., item and/or inventory information generated and maintained by inventory module 140). For example, in certain embodiments, sales module 132 may receive input for the item, such as entry of an item number, lookup of the item in a menu/sales interface, scan of a barcode, etc. After selecting items for purchase, payment module 112 and/or sales module 132 may generate a purchase request for the selected item(s), as discussed herein, for example, by gathering the item(s)/service(s) into a transaction and providing a checkout interface for completion of the transaction using payment information for user 102. The purchase request may be generated from one or more items identified by user 102 as desirable for purchase and from one or more ancillary/additional purchases required or recommended when purchasing the identified items. The checkout interface may include an option for user 102 to provide payment for the transaction, for example, using payment module 112 by submitting a purchase request to sales module 132 (e.g., a payment token including a payment account or payment card in a payment token, where payment module 112 has information necessary to provide payment through the payment instrument). In other embodiments, user 102 may provide the payment instrument to merchant device 130 (e.g., a physical payment card or entry of a login to a payment account), where sales module 132 generates the purchase request for the transaction with the submitted payment instrument.

Sales module 132 may further generate transaction histories for purchases by one or more users. For example, past receipts for past users may be collected and may be stored to database 136. The transaction histories may be utilized to determine what additional items are commonly purchased alongside or with an item (concurrently or at later time(s)). Thus, if batteries, power cords, or other items are purchased with a new electronic item, the transaction histories for the electronic item may identify associated purchases. Similarly, home maintenance items (e.g., paint) may require additional purchases (e.g., paintbrushes). Inventory module 140 and/or sales module 132 may mark the additional purchases as mandatory (e.g., in the case of labor, tax, or shipping required with the item) or as optional (e.g., in the case of paintbrushes or batteries, where user 102 may already possess the items). Thus, sales module 132 may also provide information utilized to determine one or more additional purchases required or recommended when purchasing an item.

In various embodiments, merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 170, or other types of applications. Other applications 134 may contain software programs, executable by a processor, including a graphical user interface (GUI), configured to provide an interface to a user of merchant device 130 (e.g., a merchant or merchant employee). In various embodiments where not provided by inventory module 140 and/or sales module 132, merchant device 130 may include connection and/or communication applications, which may be utilized to communication information to communication device 110 and/or payment provider server 150.

As discussed herein, merchant device 130 and/or a wireless beacon at a merchant location for merchant device 130 may communicate with communication device 110 in possession of user 102 through Bluetooth Low Energy (BLE), LTE Direct, or another communication protocol receivable by communication device 110. When establishing a connection, merchant device 130 and/or the beacon may emit a communication signal including an identifier (e.g., a Universally Unique Identifier (UUID) (e.g., through a connection application of other applications 134 and/or through the wireless beacon connected with merchant device 130). Communication device 10 may execute specialized hardware and/or software to passively monitor for the short range wireless communications. When communication device 110 detects the signal and verifies the one or more identifiers, both communication device 110 and merchant device 130/the wireless beacon may ramp up in power and establish a connection, which may identify user 102 as located at the merchant location.

The request to establish the connection may be communicated as a short range wireless communication (e.g. a BLE protocol communication) including a "wake up" process for communication device 110. In other embodiments, the request and/or connection may utilize near field communication, radio communication, infrared communication, Bluetooth communication, or WiFi communication. Additionally, although merchant device 130 and/or the wireless beacon may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices (e.g., communication device 110) and establishment of a connection for data transfers.

Additionally, merchant device 130 includes database 136. Database 136 may include inventory and/or item information used by payment module 112 and/or sales module 132 to generate a transaction, such as item information, pricing, inventory information merchant application interface components, and/or merchant information. Database 136 may further include purchase requests for the transaction, which may be processed by merchant device 130 and/or communicated to payment provider server 150 for processing of a payment. Database 136 may also store past user transaction histories and/or other information that may be utilized to determine additional purchases for an item and/or item costs and a total cost for an item with the additional purchases.

In various embodiments, merchant device 130 includes at least one communication module 138 adapted to communicate communication device 110 and/or payment provider server 150 over network 170. In various embodiments, communication module 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices. Communication module 138 may also communicate with communication device 110 directly using short range wireless communications.

Payment provider server 150 may be maintained, for example, by an online payment service provider, which may provide payment services and/or processing for financial transactions on behalf of users, including processing of received payment tokens for a transaction. In this regard, payment provider server 150 includes one or more processing applications which may be configured to interact with communication device 110, merchant device 130, and/or merchant server 140 to facilitate payment for a transaction. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102 and/or the merchant associated with merchant device 130. Moreover, in various embodiments, one or more of the applications, processes, and/or features discussed below in reference to payment provider server 150 may be included in merchant device 130, for example, features and processes offered by a true cost determination module 160.

Payment provider server 150 of FIG. 1 includes true cost determination module 160, a transaction processing module 152, other applications 154, a database 156, and a network interface component 158. True cost determination module 160, transaction processing module 152, and other applications 154 may correspond to executable processes, procedures, and/or applications with associated hardware. In other embodiments, payment provider server 150 may include additional or different modules having specialized hardware and/or software as required.

True cost determination module 160 may correspond to one or more processes to execute modules and associated specialized hardware of payment provider server 150 to receive user input identifying an item, determine additional required or recommended purchases for the item, determine a true cost for purchasing the item with one or more of the additional purchases, and communicate the additional purchases and/or the true cost to communication device 110. In this regard, transaction processing module 152 may correspond to specialized hardware and/or software to access received user input and determine an item of interest to user 102 in the user input. The user input may include a visual, text, or audio representation of the item such that true cost determination module 160 may determine the item of interest to user 102. Once the item is identified, true cost determination module 160 may determine ancillary/additional purchases for the item using accessible information.

The information accessible to true cost determination module 160 may include past transaction histories by user 102 and/or other users, which includes items commonly purchased with an item, when additional items are purchased (at time of initial purchase, within a week, periodically each month, etc.), and details associated with the item purchase (e.g., location of user, purchasing habits of the user, prior usage of purchases by the user or user household, etc.). The transaction histories may be receipts or other documents that include what items were purchased in a transaction. Additionally, the transaction history may include information about whether the additional purchases are required when purchasing the item or whether the additional purchase is optional and recommended for purchase with the item. For example, required costs that may be in a receipt may include shipping, tax, and/or construction or movement labor related to the item. Additional items that may be required may include mounting or installation items, items to repair the identified item, or ancillary items such as power cords, paintbrushes, etc. Additional purchases that may be optional may include insurance, optionally purchased items, optional delivery charges, etc. Moreover, true cost determination module 160 may determine which items are required and/or optional based on knowledge known about user 102, such as if user 102 has previously purchased and installation or use item normally required (e.g., batteries, television mounting brackets, paintbrushes, etc.). Thus, true cost determination module 160 may receive user information entered by user 102 to communication device 110 or scrapped from a third party source or a payment account for user 102 maintained by payment provider server 160.

Additional purchases may also be determined using merchant information received from merchant device 130. Merchant information may include inventory information maintained by inventory module 140. The inventory information may include information about shipping or restocking fees or other processing fees for items not currently available, labor and delivery charges particular to the merchant, or other merchant costs and fees particular to the merchant. Additionally, item information for the item identified by user 102 for purchase may be included in merchant information or may be accessed from another source. The item information may include a description of the item and/or item type/brand, status of the item, age of the item, condition of the item, or other information about the item. True cost determination module 160 may recommend additional purchases or required to purchase the additional purchases based on the item information, such as if an old item may need a repair, if an extended warranty is required or suggested, etc. The merchant information may also include costs associated with a service provided by the merchant, such as costs incurred during a repair (e.g., new items and labor costs for installation of the item).

User information for user 102 may also be accessed by true cost determination module 160, which may be utilized to determine the additional purchases. For example, personal, location, health, financial, or other user information may guide additional purchases either required or recommended by true cost determination module. The user may be associated with a home or work location that the user may have identified an item the user wishes to purchase for use at the location. The item for use at the location may include flooring, paint, new electrical or plumping, new electronics, or other item usable at a location. However, true cost determination module 160 may determine using county records and/or transaction histories or records of the location that use or installation of the item at the location may require additional purchases. For example, new flooring may require repairs to a sub-flooring, while a television may require a particular mounting system or a stud-finder to install. Similarly, a vehicle user 102 wishing to install a new audio system into may require an update to the vehicle's current electrical system, which may be determined using vehicle records or information about the vehicle's systems.

The additional purchases may also be necessitated by the user's financial status, include a potential interest rate incurred due to the user's credit rating, an interest rate of a credit card used to pay for the item, or a cost of overdrawing an account. Thus, if user 102 wishes to purchase with credit, user 102 may incur additional costs by virtue of utilizing the credit. Additional purchases may also be required due to a user's health condition or physical traits. For example, user 102 may require specific seating arrangements, medical assistance, or other health requirement when making a purchase.

True cost determination module 160 may access pricing information (e.g., menus, online pricing guides, information in inventory or item information, etc.) from merchant device 130 and/or other third party entities. The pricing information may be utilized to determine a cost for the item identified by user 102 for purchase as well as prices for the additional items. Thus, using the pricing information, true cost determination module 160 may determine a true cost for purchase of the item identified by user 102 in the user input provided by user 102 to true cost determination module 160. Once the true cost is determined the true cost may be communicated to communication device 110 and/or stored to database 156 with the identified item, the additional items, and costs for each item in the true cost.

Transaction processing module 152 may correspond to one or more processes to execute modules and associated specialized hardware of payment provider server 150 to receive and/or transmit information from communication device 110 and/or merchant device 130 for processing and completion of one or more transactions initiated by user 102. In this regard, transaction processing module 152 may correspond to specialized hardware and/or software to process a received transaction from communication device 110 and/or merchant device 130 by receiving the transaction from communication device 110 and/or merchant device 130 with a payment request for a payment for the transaction. The payment request may correspond to a payment token, including a payment instrument and identification of the transaction, and may be encrypted prior to transmission to transaction processing module 152 to prevent unauthorized receipt of a payment instrument. The payment token may include information corresponding to user identifiers, user financial information/identifiers, transaction information and/or other identifiers. Additionally, the payment token may include a payment amount and terms of payment for the transaction. Once received, transaction processing module 152 may utilize a payment account or financial information (e.g., a payment instrument such as a credit/debit card, bank account, etc.) of user 102 to render payment for the transaction. Transaction processing module 152 may receive purchase authorizations, in certain embodiments, and process payments for transaction in accordance with the purchase authorizations. Payment may be made to merchant device 130 and/or merchant server 140 using the payment instrument and the terms of the payment request. Additionally, transaction processing module 152 may provide transaction histories, including receipts, to communication device 110, merchant device 130, and/or merchant server 140 for completion and documentation of the financial transaction. Such transaction histories may be utilized to determine additional items required with future purchases by user 102 and/or other users.

In various embodiments, payment provider server 150 includes other applications 154 as may be desired in particular embodiments to provide features to payment provider server 150. For example, other applications 154 may include security applications for implementing client-side security features, programmatic client applications for interfacing with appropriate application programming interfaces (APIs) over network 170, or other types of applications. Other applications 154 may contain software programs, executable by a processor, including a graphical user interface (GUI), configured to provide an interface to user 102 when accessing payment provider server 150. In various embodiments where not provided by true cost determination module 160 and/or transaction processing module 152, other applications 154 may include connection and/or communication applications, which may be utilized to communication information to communication device 110 and/or merchant device 130.

Additionally, payment provider server 150 includes database 156. As previously discussed, user 102 and/or the merchant corresponding to merchant device 130 may establish one or more payment accounts with payment provider server 150. Payment accounts in database 156 may include user/merchant information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 150, e.g. from communication device 110 and/or merchant device 130, a payment account belonging to user 102 and/or the merchant may be found. Payment amounts may be deducted from one payment account and paid to another payment account. In other embodiments, user 102 and/or the merchant may not have previously established a payment account and may provide other financial information to payment provider server 150 to complete financial transactions, as previously discussed. Database 156 may further include information used by true cost determination module 160, such as user input, as well as information determined by true cost determination module, such as additional purchases and true costs of identified items.

In various embodiments, payment provider server 150 includes at least one network interface component 158 adapted to communicate communication device 110 and/or merchant device 130 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
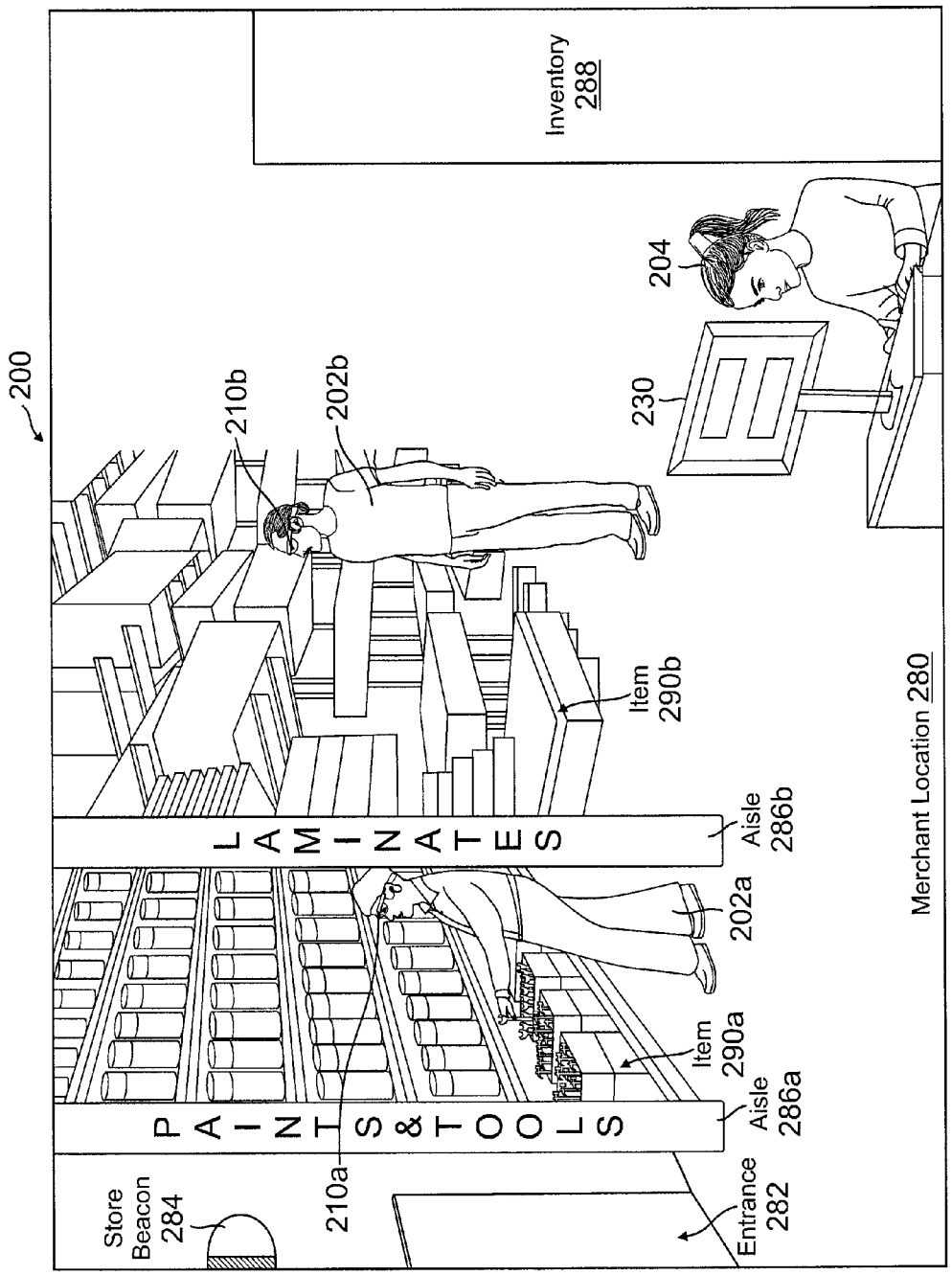
FIG. 2 is an exemplary environment where users are browsing items available at a merchant location and receiving information identifying an effective cost for purchase of the items while at the merchant location, according to an embodiment.

FIG. 2 is an exemplary environment where users are browsing items available at a merchant location and receiving information identifying a true cost for purchase of the items while at the merchant location, according to an embodiment. Environment 200 of FIG. 2 includes a user 202a having a communication device 210a and a user 202b having a communication device 210b both corresponding generally to user 102 and communication device 110, respectively, of FIG. 1. Environment 200 also includes a merchant device 230 correspond generally to merchant device 130 of FIG. 1.

In environment 200, as users 202a and 202b enter a merchant location 280 to shop for items, users 202a and 202b enter through an entrance 282 where they may be determined to be located at merchant location 280 using store beacon 284. Identification of users 202a and 202b at merchant location 280 may allow a server associated with merchant location 280 to access inventory and/or item information for merchant location 280. As users 202a and 202b browse through an aisle 286a and an aisle 286b, users 202a and 202b may utilize communication devices 210a and 210b, respectively, to enter user input corresponding to one or more devices users 202a and 202b may wish to purchase. For example, user 202a may view an item 290a on a shelf of aisle 286a and enter in user input identifying item 290a. The user input may correspond to an image, text, and/or audio input. Similarly, user 202b may view an item 290b on a shelf of aisle 286b and enter in user input identifying item 290b.

A server that may provide true cost analysis for items 290a and 290b and may access information for merchant location 280 and/or other available information for items 290a and 290b (e.g., item information for items 290a and/or 290b available from a third party and/or user information for users 202a and 202b). Information for merchant location 280 may include information available from merchant device 230, such as information for an inventory 288 available at merchant location 280. For example, inventory 288 may include stock information for items 290a and 290b as well as pricing information for items 290a and 290b. The server may utilize the information in order to determine a true cost for items 290a and 290b. Once determined, the true cost for items 290a and 290b may be communicated to communication devices 210a and 210b, respectively. Users 202a and 202b may then view the true costs for items 290a and 290b, respectively, where the true costs for items 290a and 290b may include additional purchases for items 290a and 290b. Users 202a and 202b may then complete a purchase for items 290a and 290b, respectively, with a merchant employee utilizing merchant device 230. The purchases may include one or more of the additional purchases associated with items 290a and 290b.

Figure 3:
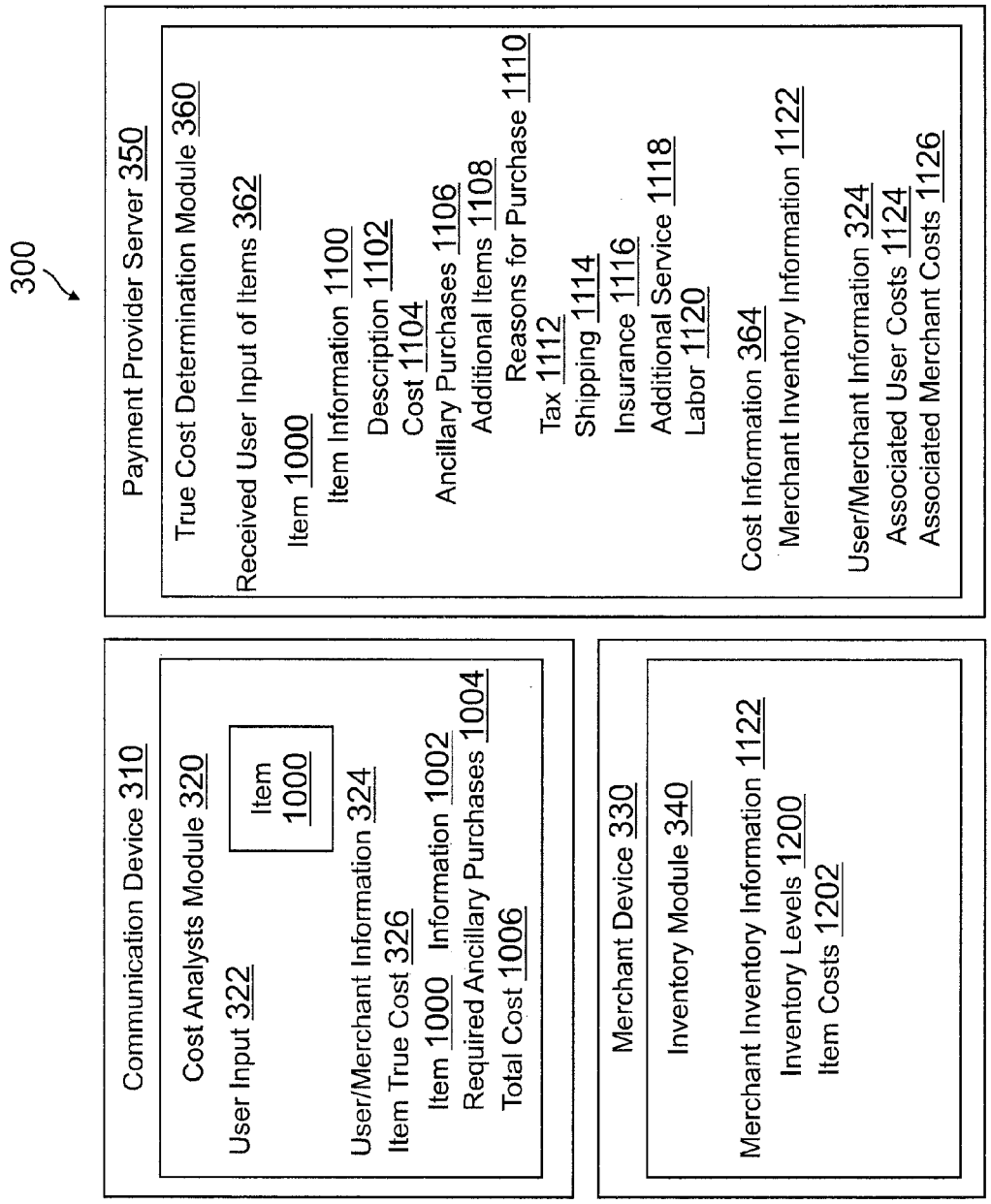
FIG. 3 is an exemplary system environment having a communication device providing user input identifying an item to a server that may determine the item's effective cost using available information about ancillary purchases with the item, according to an embodiment.

FIG. 3 is an exemplary system environment having a communication device providing user input identifying an item to a server that may determine the item's true cost using available information about ancillary purchases with the item, according to an embodiment. Environment 300 of FIG. 3 includes a communication device 310, a merchant server 330, and a payment provider server 350 corresponding generally to communication device 110, merchant server 130, and a payment provider server 150, respectively; of FIG. 1.

Communication device 310 executes a cost analysis module 320 corresponding generally to the specialized hardware and/or software modules and processes described in reference to cost analysis module 120 of FIG. 1. In this regard, cost analysis module 320 may be utilized to process user input 322 identifying an item 1000. A user of communication device 310 may enter user input 322 using a device interface or associated device, such as a keyboard, touch screen, microphone, and/or camera of communication device 310. Additionally, the user may input user/merchant information 324, for example, user personal/financial information and/or information that may identify the merchant and/or merchant location. Once additional purchases and/or a true cost for item 1000 is determined, item true cost 326 may populate, which may include item 1000 information 1002, required and/or potential ancillary purchases 1004, and a total cost 1006 for item 1000 with required and/or potential ancillary purchases 1004.

Merchant device 300 executes an inventory module 340 corresponding generally to the specialized hardware and/or software modules and processes described in reference to inventory module 140 of FIG. 1. In this regard, inventory module 340 includes information used to determine item true cost 326 shown in cost analysis module 320. Inventory module 340 includes merchant inventory information for a merchant of merchant device 330, which may include inventory levels 1200 and item costs 1202. Inventory module 340 may provide merchant inventory information 1122 to payment provider server 350 for processing with user input 322 and user/merchant information 324.

Thus, payment provider server 350 executes a true cost determination module 360 corresponding generally to the specialized hardware and/or software modules and processes described in reference to true cost determination module 160 of FIG. 1. In this regard, true cost determination module 360 includes received user input of items 362, which may include item 1000. Once item 1000 is identified as an item the user of communication device 310 is interested in, true cost determination module 360 may access item information 1100, which may include a description 1102 for item 1000 and a cost 1104 for item 1000. True cost determination module 360 may determine description 1102 and/or cost 1104 using cost information 364, which may include merchant inventory information 1122 from inventory module 340. Additionally, true cost determination module may access user/merchant information 324 having associated user costs 1124 (e.g., costs for the particular user of communication device 310, such as health requirements, repairs to a user location, etc.). User/merchant information 324 may also include associated merchant costs 1126 accessed by true cost determination module 360 (e.g., shipping, tax, labor, restocking, or other cost).

Using the above information, true cost determination module 360 may determine ancillary purchases 1106. Ancillary purchases 1106 may include additional items 1108, which may be required or recommended with item 1000. Additionally, additional items 1108 may include reasons for purchases 1110, such as why the additional items 1108 are required or recommended for purchase. Ancillary purchases 1106 also includes other types of purchases or costs, such as tax 1112, shipping 1114, insurance 1116, additional services 1118 (e.g., delivery, employee assistance, etc.), and labor 1120.

Figure 4:
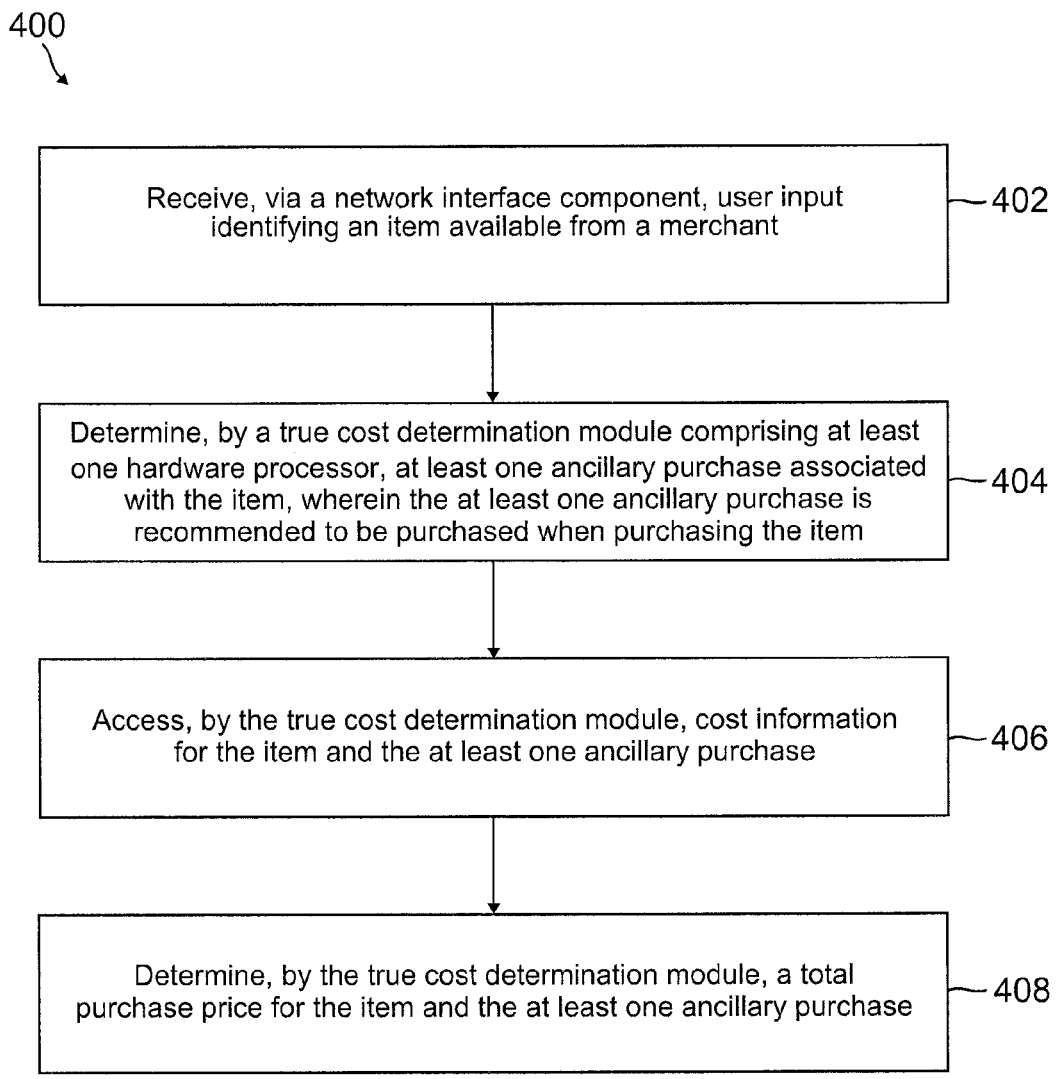
FIG. 4 is a flowchart of an exemplary process for communication device input interfaces for use in determining a true cost of an item, according to an embodiment.

FIG. 4 is a flowchart of an exemplary process for communication device input interfaces for use in determining a true cost of an item, according to an embodiment. Note that one or more steps, processes, and methods described herein may be omitted, performed in a different sequence, or combined as desired or appropriate.

At step 402, user input identifying an item available from a merchant is received, via a network interface component. The user input may be received from a communication device, which may comprise one of a smart phone and a wearable computing device. The user input may comprise at least one of an image comprising a visual representation the item, user text input comprising textual identification of the item, and voice input comprising voice identification of the item. At least one ancillary purchase associated with the item is determined, by a true cost determination module comprising at least one hardware processor, wherein the at least one ancillary purchase is recommended to be purchased when purchasing the item, at step 404. The item may comprise a first item; thus, the at least one ancillary purchase may comprise at least one second item recommended to be purchased with the first item.

User information for the user may be received by the network interface component, wherein the true cost determination module accesses the user information to determine the at least one second item. The user information may be received from the communication of the user and comprise user personal/financial information. The user information may comprise one of a home location for the user and a work location for the user. Thus, the true cost determination module may access the location information for the one of the home location and the work location from a third party entity associated with the one of the home location and the work location, and the at least one second item may be recommended for use of the first item at the one of the home location and the work location. For example, the at least one second item may comprise at least one of labor for use of the first item at the location, insurance for use of the first item, an installation item for use of the first item, and a repair for use of the first item. The location information may comprise at least one of a building history and a county record for the one of the home location and the work location, and the true cost determination module may determine the at least one ancillary purchase using the at least one of building history and the county record.

In various embodiments, merchant information for the merchant may be received by the network interface component, wherein the true cost determination module accesses the merchant information to determine the at least one second item. The merchant information may comprise shipping information for the first item to the merchant, inventory information for the first item at the merchant, local and state tax information for the merchant, insurance information for the merchant, and labor information for the first item with the merchant. Additionally, the true cost determination module may determine the at least one ancillary purchase using other user purchases purchased with the first item. The true cost determination module may further determine the other user purchases using purchase histories with merchant, similar location information for a location for the user, a building history for the location of the user, a county record for the location of the user, similar user information associated with the user, and similar purchase times for the item by the user. The true cost determination module may also access inventory information for the merchant, and determine the at least one additional purchase uses the inventory information.

At step 406, cost information for the item and the at least one ancillary purchase is accessed, by the true cost determination module. A total purchase price for the item and the at least one ancillary purchase is determined, by the true cost determination module, at step 408. The total purchase price may be communicated to a communication device of a user associated with the user input, via the network interface component. A purchase request for the total purchase price may be received from the communication device, via the network interface component and a transaction processing module may processes the purchase request to provide a payment to the merchant for the item and the at least one additional purchase. Additionally, a transaction history may be provided to at least one of the user and the merchant, by the transaction processing module.

Thus, when a user expresses interest in an item, such as by sending information about the item to a service provider, analysis is done, both generally about the item and specific to the user or similar users, to determine additional costs the user may incur with the item. The additional costs may include items needed at time of purchase or at later date(s), which may be based on the user's location, house, work, previous purchases related to the item, previous purchases on insurance (or declining insurance), typical usage of the item or a similar item by the user or similar users (e.g., heavy use, light use, use in harsher environments, user typically does all scheduled maintenances or declines, and other factors as discussed herein. As a result, the user is presented with a more accurate cost for an item, which may be more than just the listed price for the item. This may then enable the user to make a more informed decision about whether to purchase the identified item.

Figure 5:
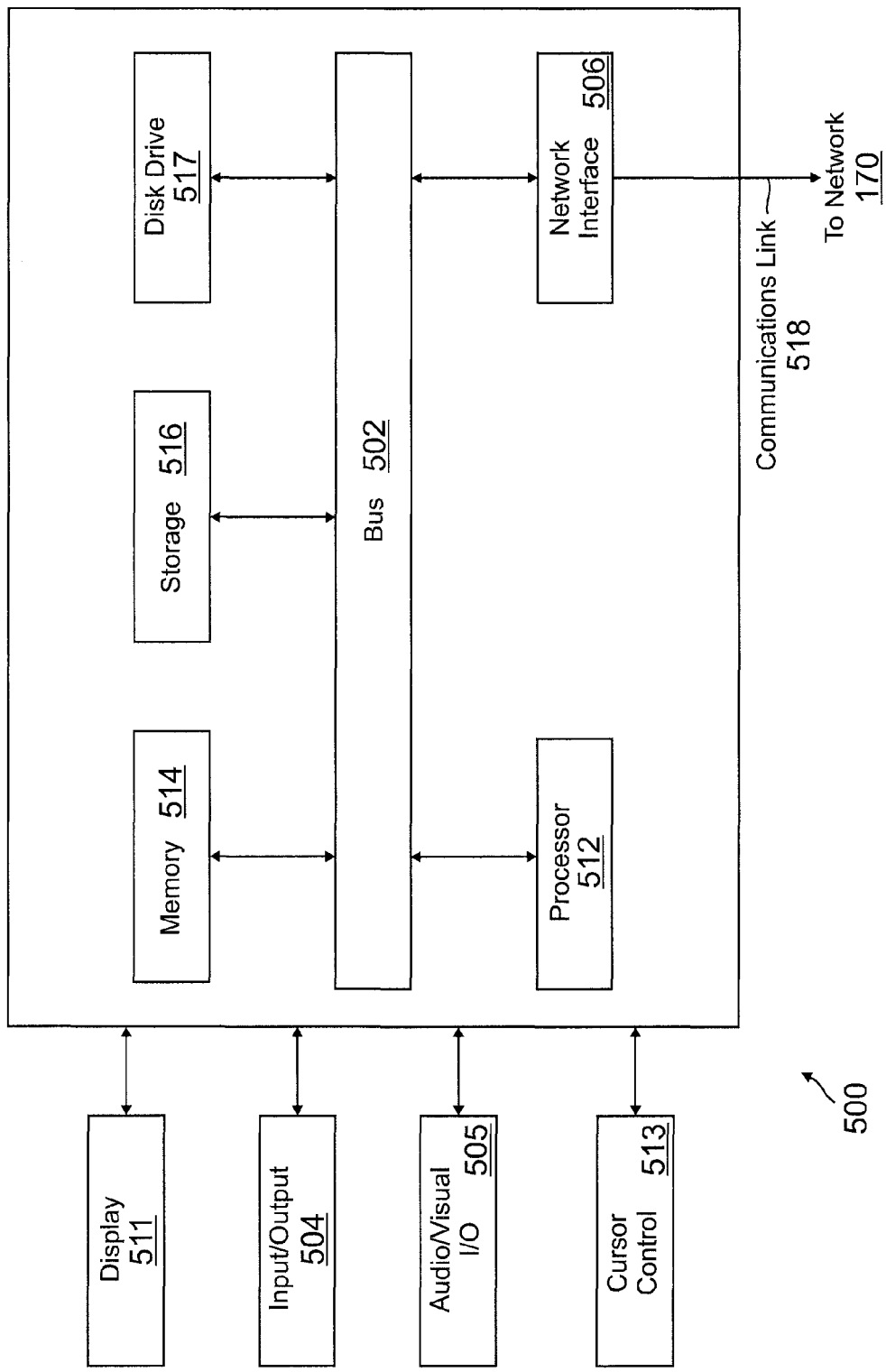
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, in-store purchases have been described, but advantages discussed herein may also be achieved through online purchases. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing cost information comprising prices for items and ancillary purchases required for purchase with the items; and
   one or more hardware processors configured to execute instructions to perform operations comprising:
   receiving, from a communication device of a user at a merchant location through a network interface component, user input identifying an item available from a merchant at the merchant location;
   receiving, from the communication device, information identifying the user at the merchant location for the merchant, and wherein the information is previously received by the communication device through a connection between the communication device and a merchant device at the merchant location;
   determining at least one ancillary purchase associated with the item, wherein the at least one ancillary purchase is recommended to be purchased when purchasing the item;
   accessing the cost information for the item and the at least one ancillary purchase, wherein the cost information for the at least one ancillary purchase is accessed using the information identifying the user at the merchant location;
   determining a total purchase price for the item and the at least one ancillary purchase at the merchant location using the cost information and the information identifying the user at merchant location; and
   communicating, through the network interface component, the total purchase price to the communication device of the user.

2. The system of claim 1, wherein the communication device comprises one of a smart phone or a wearable computing device.

3. The system of claim 1, wherein the user input comprises at least one of an image comprising a visual representation the item, user text input comprising textual identification of the item, or voice input comprising voice identification of the item.

4. The system of claim 1, wherein the item comprises a first item, and wherein at least one ancillary purchase comprises at least one second item recommended to be purchased with the first item.

5. The system of claim 4, wherein the non-transitory memory further stores user information for the user received by the network interface component, and wherein the operations further comprise:
   accessing the user information; and
   wherein the determining the at least one ancillary purchase comprises determining the at least one second item using the user information.

6. The system of claim 5, wherein the user information is received from the communication device of the user, and wherein the user information comprises user personal information.

7. The system of claim 5, wherein the user information comprises one of a home location for the user or a work location for the user, wherein the operations further comprise:
   accessing the location information for the one of the home location or the work location from a third party entity associated with the one of the home location or the work location, and wherein the at least one second item is recommended for use of the first item at the one of the home location or the work location.

8. The system of claim 7, wherein the at least one second item comprises at least one of labor for use of the first item, insurance for use of the first item, an installation item for use of the first item, or a repair for use of the first item.

9. The system of claim 7, wherein the location information comprises at least one of a building history or a county record for the one of the home location or the work location, and wherein the determining the at least one ancillary purchase comprises determining the at least one second item using the at least one of building history or the county record.

10. The system of claim 4, wherein the operations further comprise:
    accessing the merchant information;
    wherein the determining the at least one ancillary purchase comprises determining the at least one second item using the merchant information.

11. The system of claim 10, wherein the merchant information comprises at least one of shipping information for the first item to the merchant, inventory information for the first item at the merchant, local and state tax information for the merchant, insurance information for the merchant, or labor information for the first item with the merchant.

12. The system of claim 1, wherein the determining the at least one ancillary purchase further uses other user purchases purchased with the first item.

13. The system of claim 12, wherein the operations further comprise:
    determining the other user purchases using purchase histories with at least one of the merchant, similar location information for a location for the user, a building history for the location of the user, a county record for the location of the user, similar user information associated with the user, or similar purchase times for the item by the user.

14. A method comprising:
    receiving, from a communication device for a user at a merchant location through a network interface module, user input identifying an item available from a merchant at the merchant location associated with the user;
    receiving, from the communication device, information identifying the user at the merchant location for the merchant, and wherein the information is previously received by the communication device through a connection between the communication device and a merchant device at the merchant location;
    determining, by a total purchase cost determination module comprising at least one hardware processor, at least one additional purchase associated with the item, wherein the at least one additional purchase is recommended with the item;
    accessing, by the total purchase cost determination module, cost information for the item and the at least one additional purchase, wherein the cost information comprises prices for items and ancillary purchases required for purchase with the items, and wherein the cost information for the at least one ancillary purchase is accessed using the information identifying the user at the merchant location; and
    determining, by the total purchase cost determination module, a total purchase price for the item and the at least one additional purchase at the merchant location using the cost information and the information identifying the user at merchant location.

15. The method of claim 14, wherein the at least one additional purchase comprises at least one of a shipping cost, a tax cost, a restocking cost, an insurance cost, or a labor cost.

16. The method of claim 14 wherein prior to determining, by the total purchase cost determination module, the at least one additional purchase, the method further comprises:
   accessing, by the total purchase cost determination module, inventory information for the merchant,
   wherein the determining, by the total purchase cost determination module, the at least one additional purchase uses the inventory information.

17. The method of claim 14 further comprising:
   communicating, by the network interface module, the total purchase price to the communication device of the user.

18. The method of claim 17 further comprising:
   receiving, by the network interface module, a purchase request for the total purchase price; and
   processing, by a transaction processing module, the purchase request to provide a payment to the merchant for the item and the at least one additional purchase.

19. The method of claim 18 further comprising:
   providing, by the transaction processing module, a transaction history to at least one of the user or the merchant.

20. A non-transitory machine-readable medium having stored thereon machine-readable instructions executable to cause a machine to perform operations comprising:
   receiving, from a communication device for a user at a merchant location through a network interface component, user input identifying an item available from a merchant at the merchant location associated with the user;
   receiving, from the communication device, information identifying the user at the merchant location for the merchant, and wherein the information is previously received by the communication device through a connection between the communication device and a merchant device at the merchant location;
   determining, by a total purchase cost determination module comprising at least one hardware processor, at least one ancillary purchase associated with the item, wherein the at least one ancillary purchase is recommended to be purchased with the item;
   accessing, by the total purchase cost determination module, cost information for the item and the at least one ancillary purchase, wherein the cost information comprises prices for items and ancillary purchases required for purchase with the items, and wherein the cost information for the at least one ancillary purchase is accessed using the information identifying the user at the merchant location; and
   determining, by the total purchase cost determination module, a total purchase price for the item and the at least one ancillary purchase at the merchant location using the cost information and the information identifying the user at merchant location.

* * * * *